(12) United States Patent
Plattner

(10) Patent No.: US 7,690,598 B1
(45) Date of Patent: Apr. 6, 2010

(54) AIRCRAFT EXHAUST VENT ASSEMBLY

(76) Inventor: Wesley M. Plattner, 1146 Breyman Hwy., Tipton, MI (US) 48287

( * ) Notice: Subject to any disclaimer, the term of this patent is extended or adjusted under 35 U.S.C. 154(b) by 765 days.

(21) Appl. No.: 11/518,971

(22) Filed: Sep. 11, 2006

(51) Int. Cl.
*B64C 1/00* (2006.01)
*B64D 13/02* (2006.01)

(52) U.S. Cl. ..................... 244/129.1; 454/71
(58) Field of Classification Search ............. 244/58, 244/53 B, 53 R, 136, 1 R, 129.1, 162, 129.4; 454/71–74
See application file for complete search history.

(56) References Cited

U.S. PATENT DOCUMENTS

| | | | |
|---|---|---|---|
| 1,816,314 A | | 7/1931 | Canney |
| 2,058,659 A | | 10/1936 | Bellanca |
| 2,460,604 A | | 2/1949 | Simcox |
| 2,565,720 A | * | 8/1951 | Collison et al. .............. 4/111.1 |
| 3,672,291 A | | 6/1972 | Kujawa, Jr. |
| 3,733,996 A | | 5/1973 | Naccarato et al. |
| 4,033,247 A | | 7/1977 | Murphy |
| 4,103,597 A | | 8/1978 | Williams |
| 4,390,152 A | * | 6/1983 | Jorgensen ................ 244/118.5 |
| 4,394,861 A | | 7/1983 | Sciortino |
| RE32,554 E | * | 12/1987 | Murphy .................... 244/118.5 |
| 4,867,047 A | * | 9/1989 | Citron .......................... 454/347 |
| 5,080,303 A | * | 1/1992 | Hutton ....................... 244/53 R |
| 5,105,849 A | * | 4/1992 | Clough .................. 137/512.15 |
| 5,261,856 A | | 11/1993 | Walser |
| 5,305,969 A | * | 4/1994 | Odell et al. .............. 244/129.5 |
| 5,337,977 A | * | 8/1994 | Fleming et al. .......... 244/129.5 |
| 5,344,361 A | * | 9/1994 | Matthias ...................... 454/129 |
| 5,727,999 A | * | 3/1998 | Lewis .......................... 454/162 |
| 5,931,415 A | * | 8/1999 | Lingard et al. ........... 244/129.5 |
| 6,092,360 A | * | 7/2000 | Hoag et al. ..................... 60/783 |
| 6,116,541 A | * | 9/2000 | Chuang et al. ........... 244/129.4 |
| 6,210,266 B1 | * | 4/2001 | Barton ....................... 454/162 |
| 6,468,148 B1 | * | 10/2002 | Furusawa et al. ........... 454/164 |
| 6,945,278 B2 | * | 9/2005 | Bunn et al. ................ 137/899.2 |
| 7,137,880 B2 | * | 11/2006 | Omiya et al. ................ 454/162 |
| 7,198,062 B2 | * | 4/2007 | Hoffman et al. ........ 137/601.09 |
| 7,281,686 B2 | * | 10/2007 | Wood ....................... 244/129.3 |
| 7,410,415 B2 | * | 8/2008 | Ronnlund et al. ........... 454/162 |
| 2003/0022616 A1 | * | 1/2003 | Stiehl ......................... 454/162 |
| 2003/0171090 A1 | * | 9/2003 | Shaikh ......................... 454/66 |

* cited by examiner

*Primary Examiner*—Michael R Mansen
*Assistant Examiner*—Joseph W Sanderson
(74) *Attorney, Agent, or Firm*—Young Basile Hanlon & MacFarlane, P.C.

(57) ABSTRACT

An aircraft exhaust vent assembly for venting an exhaust gas through a window opening formed in an airplane fuselage. The aircraft exhaust vent assembly has an enclosure connected to the airplane fuselage and at least partially disposed within the window opening. An inlet is formed in the enclosure and connectable to an exhaust gas source for directing the exhaust gas into the enclosure. An outlet is formed in the enclosure for venting said exhaust gas to the exterior of the airplane fuselage. An outlet flap is connected to the enclosure for movement between a first position and a second position. In the first position, the outlet flap substantially seals the outlet in the enclosure when the exhaust gas is not supplied to the enclosure. In the second position, the outlet flap does not seal the outlet in the enclosure to allow for venting of the exhaust gas to the exterior of the airplane fuselage.

17 Claims, 3 Drawing Sheets

AIRCRAFT EXHAUST VENT ASSEMBLY

FIELD OF THE INVENTION

The present invention relates to the field of vent assemblies, and more particularly, the present invention relates to an aircraft exhaust vent assembly that automatically opens in order to vent an exhaust gas.

BACKGROUND OF THE INVENTION

Many of the electronic systems that are present on an airplane are temperature sensitive and prone to premature failure if subjected to extreme heat. For this reason, airplanes must have cooling systems that maintain a reasonable temperature within the airplane while it is not in use in order to maintain the integrity of the electronic systems aboard the airplane. Most modern day airport terminals have cooling systems that can be attached to an airplane to regulate its temperature while it is parked at the airport terminal. However, self-contained, on-board cooling systems are carried on airplanes to cool the electronic systems in cases where an external cooling system is not available, for example, when the airplane is not parked at a terminal or is parked at a terminal where an external cooling system is not present. On-board cooling systems typically utilize large, petroleum-based motors for operating the cooling system and any other systems on the airplane that require power. However, such systems are not efficient, as the motors must run for one to two hours in order to sufficiently cool the electronic systems on board the airplane. Consequently, the operation of petroleum-based motors in connection with airplane cooling can be very expensive and is therefore undesirable in the aviation industry.

As an alternative to petroleum-based motors, electrical motors have been used to power cooling systems on airplanes. However, electrical cooling systems produce heated exhaust air, which must be vented from the airplane. When an airplane is retrofitted so that an electrical cooling system may be installed, an exhaust vent must be added to the airplane. While the vent must be able to open to vent cooling system exhaust, the vent needs to remain sealed while the airplane is in flight so that cabin pressure is maintained. Although it is known to provide vents that may be manually sealed prior to takeoff, this creates an additional, and therefore undesirable, task for the crew. Furthermore, having a new opening in the fuselage of the airplane for an exhaust vent constitutes a design change for which the air-worthiness of the airplane must be revalidated. Thus, the expense of such a design change would outweigh the benefits obtained by using electrically operated cooling systems, as opposed to petroleum-operated cooling systems, and therefore, such a design change is not warranted.

It would be desirable to provide an aircraft exhaust vent assembly that automatically seals when not in use. It would also be desirable to provide an aircraft exhaust vent assembly that can be installed in an aircraft while avoiding recertification and revalidation of the aircraft.

BRIEF SUMMARY OF THE INVENTION

The present invention provides an aircraft exhaust vent assembly for venting an exhaust gas through a window opening formed in an aircraft fuselage. The aircraft exhaust vent assembly has an enclosure connected to the aircraft fuselage and disposed at least partially within the window opening. An inlet is formed in the enclosure and connectable to an exhaust gas source for directing the exhaust gas into the enclosure. An outlet is formed in the enclosure for venting the exhaust gas to the exterior of the aircraft fuselage. An outlet flap is connected to the enclosure for movement between a first position and a second position. In the first position, the outlet flap substantially seals the outlet when the exhaust gas is not supplied to the enclosure. In the second position, the outlet flap does not seal the outlet, and the enclosure is allowed to vent the exhaust gas supplied to the enclosure.

The aircraft exhaust vent assembly may have a frame which is connectable to the aircraft fuselage. The enclosure may be either connected to the frame, or may be formed integrally with the frame. Furthermore, the enclosure may have a first opening and a second opening, wherein the enclosure is connected to the frame adjacent to the first opening such that the first opening is in fluid communication with the outlet when the outlet flap is in the second position, and wherein at least one window pane is disposed in the second opening.

The outlet flap may complementarily engage the frame to close the first opening when the outlet flap is in the first position, and the outlet flap may be disposed substantially within the enclosure when the outlet flap is in the second position.

To indicate to users that the outlet flap is not sealed with respect to the outlet, a flag may be connected to the enclosure, wherein the flag is not visible from the exterior of the aircraft fuselage through the second opening of the frame when the outlet flap is in the first position and wherein the flag is visible from the exterior of the aircraft fuselage through the second opening when the outlet flap is in the second position.

For moving the outlet flap between the first and second positions, an actuator may be operatively connected to the outlet flap for biasing the outlet flap toward the second position when the exhaust gas is supplied to the enclosure. For preventing movement of the outlet flap toward the second position when the exhaust gas is not being supplied to the enclosure, a locking member may be provided. The locking member is engageable with the outlet flap for restraining the outlet flap against movement from the first position toward the second position when the exhaust gas is not being supplied to the enclosure.

BRIEF DESCRIPTION OF THE DRAWINGS

The description herein makes reference to the accompanying drawings, wherein like-referenced numerals refer to like parts throughout several views and wherein.

DETAILED DESCRIPTION OF THE INVENTION

Figure 1:
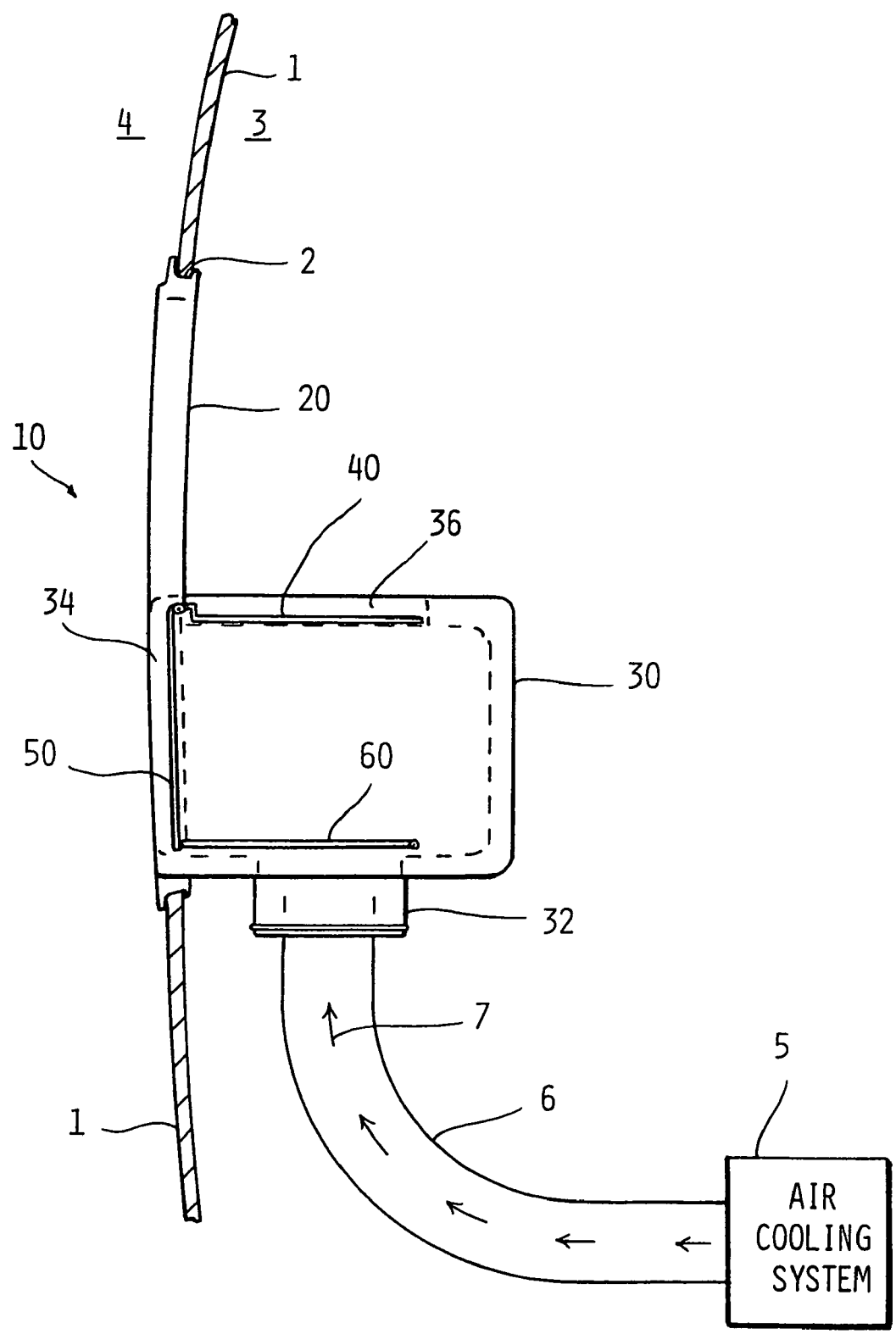
FIG. 1 is a side view of the aircraft exhaust vent assembly of the present invention installed in an airplane fuselage.

Referring to the drawings, the present invention will now be described in detail with reference to the preferred embodiment.

FIG. 1 shows an aircraft exhaust vent assembly 10 of the present invention for venting an exhaust gas 7 from an exhaust gas source 5 from the interior 3 of an airplane (not shown) to the exterior 4 of the airplane's fuselage 1. Although the present invention is ideally suited for use in airplanes, it is anticipated that the present invention may be utilized on various aircraft. For purposes of the detailed description, the specification will describe the present invention being utilized on airplanes. The aircraft exhaust vent assembly has a frame 20 connected to an opening 2 in the airplane's fuselage 1 and an enclosure 30 connected to the frame 20. The aircraft exhaust vent assembly 10 also has an outlet flap 50, an actuator flap 40 for selectively biasing the outlet flap 50, and a locking flap 60 for selectively restraining movement of the outlet flap 50. The outlet flap 50 is pivotally connected to the enclosure 30 for movement between a first position, for venting the exhaust gas 7 to the exterior 4 of the airplane's fuselage 1, and a second position, for sealing the aircraft exhaust vent assembly 10 when the exhaust gas 7 is not being supplied to the enclosure 30.

The aircraft exhaust vent assembly 10 may be used to remove exhaust gases 7 from an airplane while the airplane is parked, but the aircraft exhaust vent assembly 10 will remain sealed while the airplane is in flight, thus maintaining cabin pressure aboard the airplane. Although the aircraft exhaust vent assembly 10 may be used for many, varied applications, one particular application of the aircraft exhaust vent assembly 10 arises when adding an on-board air cooling system, which may be considered an exhaust gas source 5 for the purposes of the discussion herein. However, adding an opening 2 to the airplane fuselage 1 for the purpose of venting a newly added exhaust gas source 5 would constitute an undesirable structural modification to the airplane. Thus, the frame 20 of the aircraft exhaust vent assembly 10 may be received in an existing opening 2 in the airplane fuselage 1, such as a pre-existing window opening. However, the present invention is not limited to installation in a pre-existing window opening, and the opening 2 in which the aircraft exhaust vent assembly 10 is installed may be any opening in the airplane fuselage 1 that extends from the interior 3 to the exterior 4 of the airplane fuselage 1, whether originally existing, or later added to the airplane.

Figure 2:
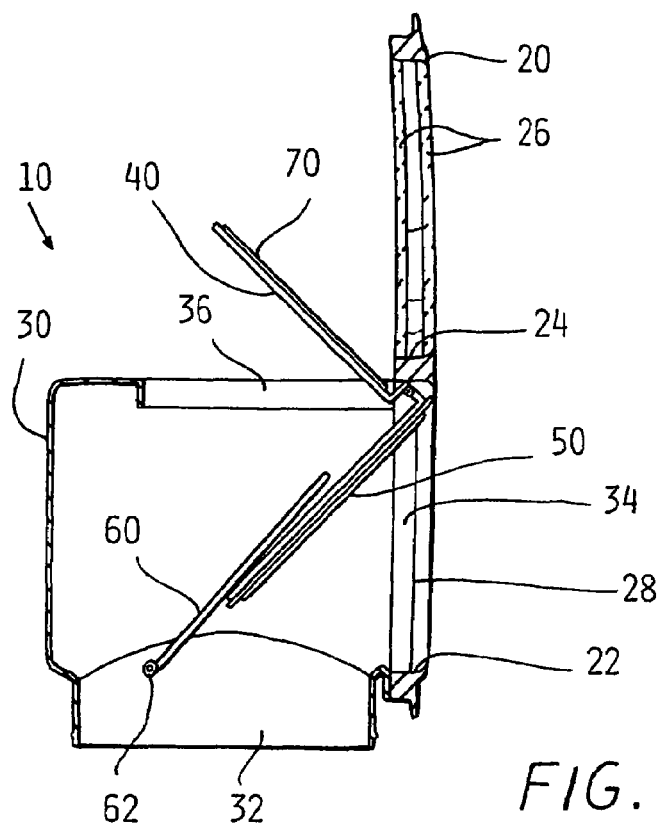
FIG. 2 is a cross-sectional view of the aircraft exhaust vent assembly of the present invention.

The frame 20 of the aircraft exhaust vent assembly 10 may be of any size and shape convenient to connect to the enclosure 30 and substantially occupy the opening 2 in the airplane fuselage 1 in a sealed manner. For example, the frame 20 may be substantially rectangular if the aircraft exhaust vent assembly 10 is to be installed in a substantially rectangular window opening 2. As shown in FIG. 2, the frame 20 is substantially oval shaped and has a first opening 22 that extends through the lower half of the frame 20 and a second opening 24 that extends through the upper half of the frame 20. Accordingly, the first opening 22 and the second opening 24 both have substantially semi-oval shapes. The first opening 22 of the frame 20 is adjacent to the enclosure 30 to allow venting of the exhaust gas 7 from the enclosure 30 through the frame 20, as will be described in detail herein. The second opening 24 of the frame 20 may be used as a window. For this purpose, one or more conventional window panes 26 may be disposed within the second opening 24 of the frame 20. The window panes 26 are substantially planar elements which are either substantially transparent or translucent. The window panes 26 may be formed from any suitable material, such as glass or plastic. The window panes 26, in combination with the second opening 24 of the frame 20, allow for at least partial visibility of the exterior of the airplane from the interior 3 of the airplane fuselage 1, as well as allowing at least partial visibility of the interior 3 of the airplane fuselage 1 from the exterior of the airplane. Of course, the window panes 26 are sealed to maintain pressurization of the cabin when the airplane is airborne.

The enclosure 30 receives the exhaust gas 7 from the exhaust gas source 5, and selectively vents the exhaust gas 7. The enclosure 30 is substantially box-shaped, substantially hollow, and is disposed either adjacent to the opening 2, or partially within the opening 2. Because the enclosure 30 receives and vents the exhaust gas 7 through discrete openings, the enclosure 30 is constructed from a material that is substantially impermeable to gases. For example, plastic would be a suitable material from which to fabricate the enclosure 30. The exact shape and size of the enclosure 30 is arbitrary, except to the extent that the shape and size of the enclosure 30 are controlled by the size and shape of the outlet flap 50, since the outlet flap 50 may move such that it is disposed substantially within the enclosure 30, as will be described in detail herein.

A plurality of openings are formed through the walls of the enclosure 30, namely, an inlet 32, an outlet 34, and an actuator opening 36, which are each in communication with the substantially hollow interior of the enclosure 30. In order to direct the exhaust gas 7 from the exhaust gas source 5 into the enclosure 30, the inlet 32 provides a substantially tubular opening. The inlet 32 is formed through the bottom of the enclosure 30 and allows fluid communication between the interior of the enclosure 30 and the exhaust gas 7. In order to supply the exhaust gas 7 to the inlet 32 of the enclosure 30, the inlet 32 may be connected to the exhaust gas source 5 directly, or by way of an exhaust vent 6, which may be a tube, hose, duct, or similar structure that is connected both to the inlet 32 and to the exhaust gas source 5.

The outlet 34 of the enclosure 30 is formed through a side of the enclosure 30 such that the outlet 34 faces the exterior 4 of the airplane fuselage 1 to allow for venting of the exhaust gas 7. The size and shape of the outlet 34 are selected to match the size and shape of the outlet flap 50 and, as such, may be any practical size and shape.

The actuator opening 36 of the enclosure 30 is formed through the top of the enclosure 30 for providing air pressure from the exhaust gas 7 to the actuator flap 40. Accordingly, the size and shape of the actuator opening 36 are selected to match the size and shape of the actuator flap 40, which will be discussed in detail herein in connection with the structure and operation of the actuator flap 40.

The enclosure 30 is connected to the frame 20 at a point adjacent to the first opening 22. In order that the exhaust gas 7 may be vented from the enclosure 30 through the frame 20, the enclosure 30 is oriented with respect to the frame 20 so as to place the outlet 34 adjacent to the first opening 22 of the frame 20. Accordingly, fluid communication may be established between the first opening 22 of the frame 20 and the outlet 34 of the enclosure 30. Conventional fasteners and methods may be used to connect the enclosure to the frame 20. Alternatively, the enclosure 30 and the frame 20 may be formed integrally. It should be noted, however, that the aircraft exhaust vent assembly 10 could be constructed without the frame 20, in which case the enclosure 30 would be connected directly to the airplane fuselage 1.

Figure 4A:
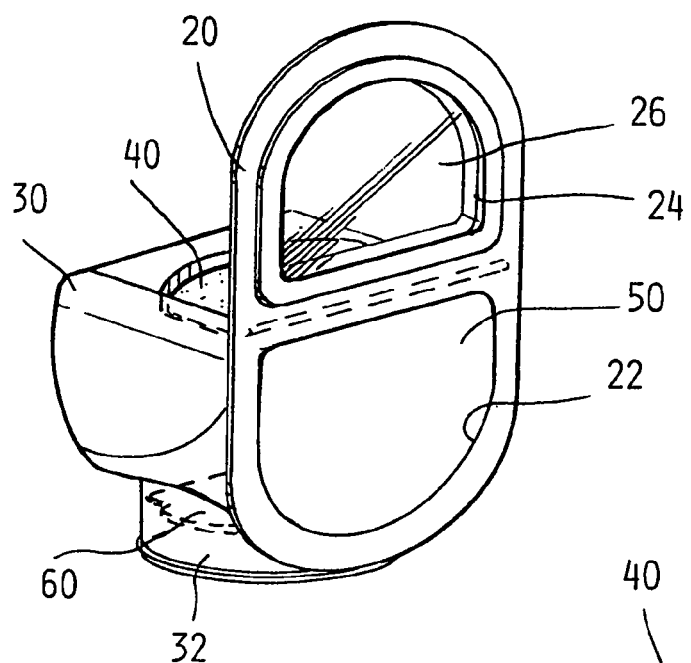
FIG. 4A is a perspective view of the aircraft exhaust vent assembly of the present invention wherein the outlet flap is in the first position.
Figure 4B:
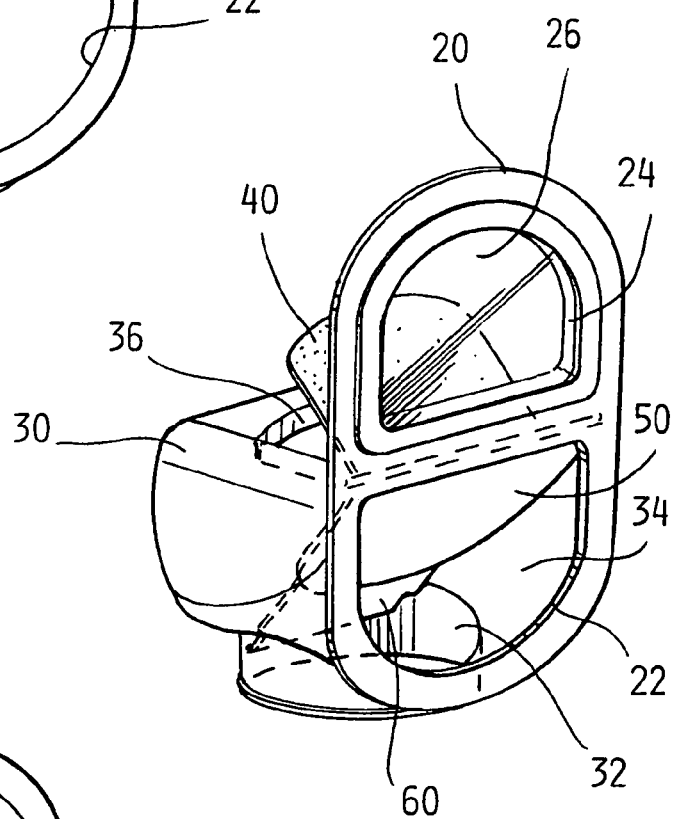
FIG. 4B is a perspective view of the aircraft exhaust vent assembly of the present invention wherein the outlet flap is in a position intermediate the first position and the second position.
Figure 4C:
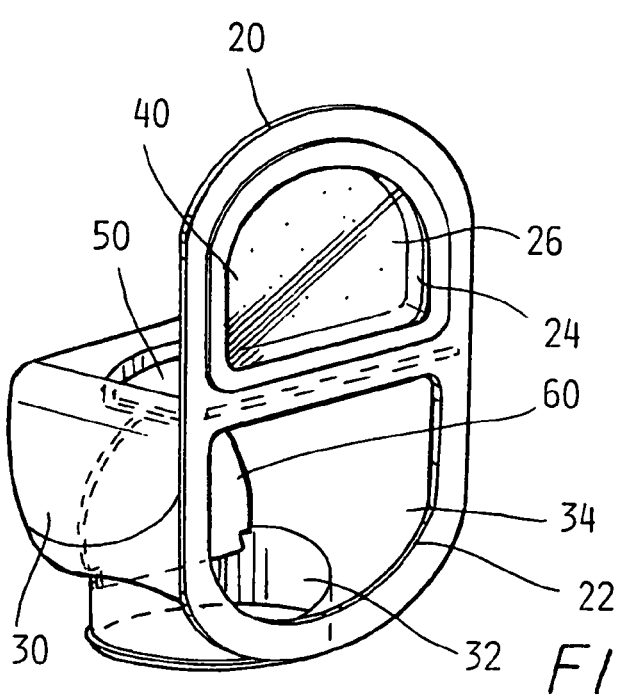
FIG. 4C is a perspective view of the aircraft exhaust vent assembly of the present invention wherein the outlet flap is in the second position.

The enclosure 30 will be better understood upon discussion of the outlet flap 50, the actuator flap 40, and the locking flap 60, which are all pivotally connected to the enclosure 30. In particular, the outlet flap 50, the actuator flap 40, and the locking flap 60 allow the enclosure 30 to selectively vent the exhaust gas 7 by moving between the first position and the second position. The first position, shown in FIG. 4A, is established when the exhaust gas source 5 is not supplying the exhaust gas 7 to the enclosure 30. In the first position, the outlet flap 50 sealingly engages the frame 20 and substantially seals the outlet 34, and thus, the enclosure 30 is not in fluid communication with the exterior 4 of the airplane fuselage 1. The second position, shown in FIG. 4C, is established when the exhaust gas source 5 supplies the exhaust gas 7 to the enclosure 30 and allows for venting of the exhaust gas 7 through the outlet 34. In the second position, the outlet flap 50 does not seal the outlet 34, and the enclosure 30 is in fluid communication with the exterior 4 of the airplane fuselage 1.

Figure 3:
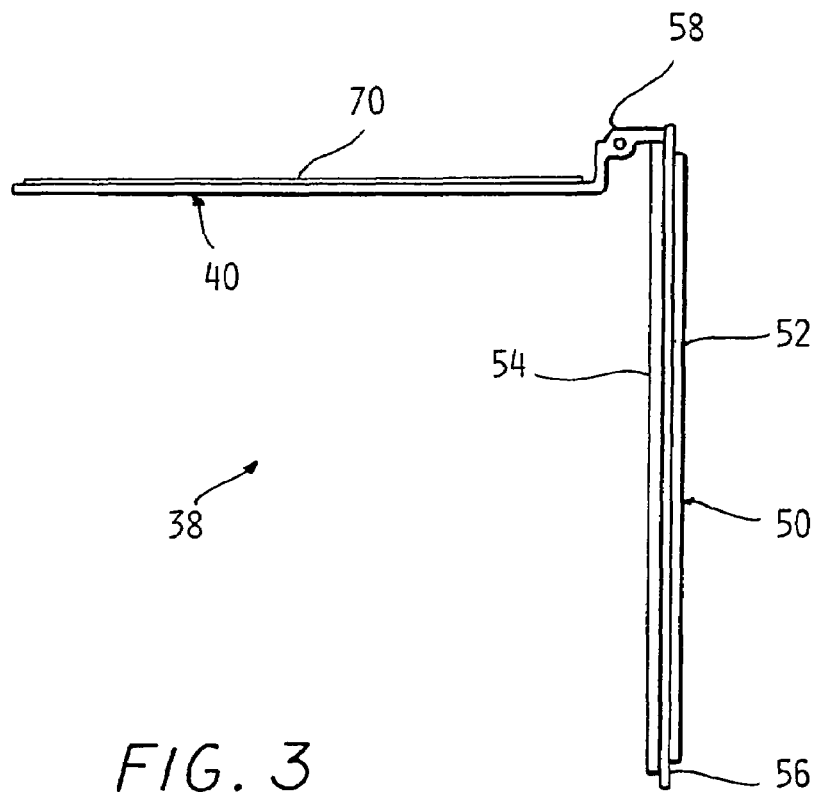
FIG. 3 is a side view showing the flap assembly of the aircraft exhaust vent assembly of the present invention.

The outlet flap 50 is sized so that it may substantially occupy the first opening 22 of the frame 20 and thus block fluid communication between the enclosure 30 and the exterior 4 of the airplane fuselage 1. In order that the outlet flap 50 may block the first opening 22, the outlet flap 50 has a front face portion 52, a rear portion 54, and a gasket 56, as shown in FIG. 3. The first opening 22 of the frame 20 is slightly smaller than the outlet 34, and thus, an interior periphery 28 of the first opening 22 of the frame 20 faces the interior of the enclosure 30. The front face portion 52 of the outlet flap 50 is substantially identical in size to the first opening 22 of the frame 20, thus allowing the front face portion 52 of the outlet flap 50 to be disposed within the first opening 22 of the frame 20 when the outlet flap 50 is in the first position. To allow the outlet flap 50 to sealingly engage the frame 20, the rear portion 54 of the outlet flap 50 is slightly larger than the front face portion 52 of the outlet flap 50 and the first opening 22 of the frame 20. Furthermore, the gasket 56 is disposed adjacent to the rear portion 54 of the outlet flap 50 and on the periphery of the front face portion 52 of the outlet flap 50. Thus, the gasket 56 complementarily engages the interior periphery 28 of the first opening 22 of the frame 20 when the outlet flap 50 is in the first position.

The actuator flap 40 and the actuator opening 36, in combination, serve as an actuator for biasing the outlet flap 50 toward the second position when the exhaust gas 7 is being supplied to the enclosure 30 by the exhaust gas source 5. The actuator flap 40 is operatively connected to the outlet flap 50 and may be rigidly connected to the outlet flap 50. Furthermore, the actuator flap 40 is pivotally connected to the enclosure 30 and is sized so that it substantially blocks the actuator opening 36 when the outlet flap 50 is in the first position. Thus, when the exhaust gas 7 is being supplied to the enclosure 30, the resulting air pressure acting on the actuator flap 40 biases the actuator flap 40 to pivot toward the second position. Accordingly, the size of the actuator flap 40 is selected according to the air pressure of the exhaust gas 7 and the weight of the outlet flap 50, such that the pressure of the exhaust gas 7 acting against the actuator flap 40 causes the actuator flap 40 to bias the outlet flap 50 toward the second position. Moreover, when the outlet flap 50 reaches the second position, the actuator flap 40 is disposed substantially outside of the enclosure 30, and the actuator flap 40 may be adjacent to the window panes 26 in the second opening 24 of the frame 20. However, due to the connection between the outlet flap 50 and the actuator flap 40, the actuator flap 40 is restrained against movement into the enclosure 30 by complementary engagement of the outlet flap 50 with the frame 20. Accordingly, where the outlet 34 and the actuator opening 36 are disposed on perpendicularly extending faces of the enclosure 30, the actuator flap 40 and the outlet flap 50 may extend substantially perpendicular to one another.

The outlet flap 50 and the actuator flap 40 may be constructed integrally as portions of a flap assembly 38. Thus, when constructed as an integral flap assembly 38, the outlet flap 50 and the actuator flap 40 move in unison, that is, in fixed relation to one another. Specifically, the flap assembly 38 is pivotally connected to the enclosure 30 by a hinge 58 to allow the actuator flap 40 and the outlet flap 50 to move between the first position and the second position. However, it is noted that the actuator flap 40 and the outlet flap 50 need not be formed integrally, and an operative connection between the actuator flap 40 and the outlet flap 50 is all that is required.

The locking flap 60 of the aircraft exhaust vent assembly 10 is pivotally connected to the enclosure 30 at a hinge 62 adjacent to the inlet 32. The hinge 62 may be a pivot pin or any other conventional structure. The locking flap 60 is biased into engagement with the inlet 32 by gravity, and thus, the locking flap 60 is sized larger than the inlet 32, so that the locking flap 60 may substantially block fluid communication between the enclosure 30 and the exhaust vent 6 across the inlet 32. The hinge 62 is opposite the outlet 34, and the locking flap 60 is substantially similar in length to the distance between the hinge 62 and the outlet flap 50. The locking flap 60 is thus engageable with the rear portion 54 of the outlet flap 50, and the locking flap 60 serves as a locking member which restrains the outlet flap 50 from moving from the first position toward the second position. However, due to the position of the locking flap 60 with respect to the inlet 32, the locking flap 60 pivots about the hinge 62 in response to a supply of the exhaust gas 7 from the exhaust gas source 5. When exhaust gas 7 is not supplied, the locking flap 60 is substantially perpendicular to the outlet flap 50, and the locking flap 60 restrains movement of the outlet flap 50. However, when the locking flap 60 has pivoted between 2° and 4° in response to the pressure of the exhaust gas 7 at the inlet 32, the locking flap 60 no longer restrains movement of the outlet flap 50, and, to the contrary, engagement of the outlet flap 50 with the locking flap 60 pivots the locking flap 60 further away from the inlet 32, as shown in FIG. 4B. In this manner, the locking flap 60 substantially blocks the inlet 32 of the enclosure 30 when the outlet flap 50 is in the first position, and the locking flap 60 does not block the inlet 32 of the enclosure 30 when the outlet flap 50 is in the second position.

While the exhaust gas 7 is being supplied to the enclosure 30 and the outlet flap 50 is in the second position, the airplane cannot be flown, because cabin pressure would be compromised by fluid communication between the interior 3 and the exterior 4 of the airplane fuselage 1. In order to provide a visual indication that the aircraft exhaust vent assembly 10 is open, a flag 70 is mounted to the actuator flap 40, such that the flag 70 faces the window pane 26 in the second position. In this manner, the flag 70 is at least partially visible through the window panes 26 from the outside of the airplane when the aircraft exhaust vent assembly 10 is open. However, when the outlet flap 50 is in the first position, the flag 70 is not visible from the outside of the airplane. Although a number of structures could be used to fabricate the flag 70, a coating or indicia bearing a bright and/or reflective color is specifically contemplated.

In operation, an airplane may be retrofitted to incorporate the aircraft exhaust vent assembly 10 in an existing opening 2, such as a window opening 2, so that an exhaust gas source 5, such as an on-board air cooling system, may be added to the airplane. When the exhaust gas source 5 is not in operation, the outlet flap 50 is in the first position, and the enclosure 30 is sealed with respect to the exterior 4 of the airplane fuselage 1. Specifically, in the first position, the outlet flap 50 blocks the outlet 34 of the enclosure 30 and the first opening 22 of the frame 20. Fluid communication between the enclosure 30 and the exterior 4 of the airplane fuselage is prevented by the gasket 56 of the outlet flap 50, which engages the interior periphery 28 of the first opening 22 of the frame 20, thus sealing the aircraft exhaust vent assembly 10 with respect to the exterior 4 of the airplane fuselage 1. While the airplane is in flight, there is a possibility that pressure differences between the interior 3 and the exterior 4 of the airplane fuselage 1 could cause the outlet flap 50 to open spontaneously, thus jeopardizing cabin pressure. Accordingly, when the outlet flap 50 is in the first position and the exhaust gas source 5 is not supplying the exhaust gas 7 to the enclosure 30, the locking flap 60 is disposed substantially perpendicular to the outlet flap 50 such that the edge of the locking flap 60 engages the rear portion 54 of the outlet flap 50 to prevent the outlet flap 50 from moving toward the second position.

After the airplane lands and the exhaust gas source 5 is placed into operation, for example, to cool the air inside the airplane, the flow of exhaust gas 7 causes the outlet flap 50 to automatically move from the first position to the second position, so that the exhaust gas 7 may be vented to the exterior of the airplane. Specifically, when the exhaust gas source 5 supplies the exhaust gas 7 to the enclosure 30, the locking flap 60 initially moves between 2° and 4°, such that the outlet flap 50 is free to move into the enclosure 30 and toward the second position. Subsequent air pressure increases within the enclosure 30 from the exhaust gas 7 and biases the actuator flap 40 out of the actuator opening 36 such that at least a portion of the exhaust gas 7 escapes through the actuator opening 36 and into the cabin of the airplane. However, as the actuator flap 40 pivots outward, the outlet flap 50 moves further into the enclosure 30 and into the path of the exhaust gas 7. Thus, the outlet flap 50 is biased into the second position by the exhaust gas 7, thereby establishing fluid communication between the enclosure 30 and the exterior 4 of the airplane fuselage 1, thus venting the exhaust gas 7 from the enclosure 30. While the outlet flap 50 is in the second position, the actuator flap 40 is adjacent to the window panes 26 in the second opening 24 of the frame 20, and the flag 70 is visible from the exterior of the airplane.

When the exhaust gas source 5 stops supplying the exhaust gas 7 to the enclosure 30, the outlet flap 50 automatically closes by moving from the second position to the first position, thereby blocking fluid communication between the enclosure 30 and the exterior 4 of the airplane fuselage 1, thereby sealing the enclosure 30 with respect to the exterior 4 of the airplane fuselage 1. Specifically, in the absence of the biasing force exerted upon the outlet flap 50 by the exhaust gas 7, the outlet flap 50 and the actuator flap 40 move toward the first position due to self-weight. When the outlet flap 50 reaches the first position, the gasket 56 of the outlet flap 50 engages the interior periphery 28 of the first opening 22 of the frame 20, thus sealing the aircraft exhaust vent assembly 10 with respect to the exterior 4 of the airplane fuselage 1. Additionally, the locking flap 60 returns to a position which is substantially perpendicular to the outlet flap 50 and engages the rear portion 54 of the outlet flap 50 to restrain the outlet flap 50 from moving toward the second position until supply of the exhaust gas 7 resumes.

While the invention has been described in connection with what is presently considered to be the most practical and preferred embodiment, it is to be understood that the invention is not to be limited to the disclosed embodiments, but on the contrary, it is intended to cover various modifications and equivalent arrangements included within the spirit and scope of the appended claims. The scope is to be accorded the broadest interpretation so as to encompass all such modifications and equivalent structures as is permitted under the law.

What is claimed is:

1. An aircraft exhaust vent assembly for venting an exhaust gas through a window opening formed in an aircraft fuselage, comprising:
    an enclosure connected to said aircraft fuselage and at least partially disposed within said window opening;
    an inlet formed in said enclosure and connectable to an exhaust gas source for directing said exhaust gas into said enclosure;
    an outlet formed in said enclosure for venting said exhaust gas to an exterior of said aircraft fuselage;
    an outlet flap connected to said enclosure for movement between a first position, wherein said outlet flap substantially seals said outlet in said enclosure when said exhaust gas is not supplied to said enclosure, and a second position, wherein said outlet flap does not seal said outlet in said enclosure to allow for venting of said exhaust gas to said exterior of said aircraft fuselage;
    a frame receivable in said window opening of said aircraft fuselage, said frame having a first opening and a second opening;
    said enclosure connected to said frame such that said outlet of said enclosure located adjacent to said first opening of said frame, wherein said first opening is in fluid communication with said outlet of said enclosure when said outlet flap is in said second position;
    at least one window pane disposed in said second opening; and
    a flag connected to said enclosure, wherein said flag is not visible from the exterior of said aircraft fuselage through said second opening of said frame when said outlet flap is in the first position, and wherein said flag is visible from the exterior of said airplane fuselage through said second opening of said frame when said outlet flap is in the second position to indicate that said outlet flap is not sealed with respect to said outlet.

2. The aircraft stated in claim 1, further comprising:
    said outlet flap complementarily engaging said frame when said outlet flap is in said first position.

3. The aircraft stated in claim 1, further comprising:
    said outlet flap disposed substantially within said enclosure when said outlet flap is in said second position.

4. The aircraft stated in claim 1, further comprising:
    an actuator operatively connected to said outlet flap for biasing said outlet flap toward said second position when said exhaust gas is being supplied to said enclosure.

5. The aircraft stated in claim 1, further comprising:
    a locking member engageable with said outlet flap for restraining said outlet flap from moving toward said second position when said exhaust gas is not being supplied to said enclosure.

6. An aircraft exhaust vent assembly for venting an exhaust gas through a window opening formed in an aircraft fuselage, comprising:
    a frame receivable within said window opening of said airplane fuselage;
    an enclosure connected to said frame and at least partially disposed within said window opening;
    an inlet formed in said enclosure and connectable to an exhaust gas source for directing said exhaust gas into said enclosure;

an outlet formed in said enclosure for venting said exhaust gas to an exterior of said aircraft fuselage;

an outlet flap connected to said enclosure for movement between a first position, wherein said outlet flap substantially seals said outlet in said enclosure when said exhaust gas is not supplied to said enclosure, and a second position, wherein said outlet flap does not seal said outlet in said enclosure to allow for said exhaust gas to be vented to the exterior of said aircraft fuselage; and an actuator activated by a supply of said exhaust gas to said enclosure, said actuator operatively connected to said outlet flap for biasing said outlet flap toward said second position when said exhaust gas is supplied to said enclosure and for biasing said outlet flap toward said first position when said exhaust gas is not supplied to said enclosure.

7. The aircraft exhaust vent assembly stated in claim 6, further comprising:

a locking member engageable with said outlet flap for restraining said outlet flap from moving toward said second position when said exhaust gas is not supplied to said enclosure.

8. The aircraft exhaust vent assembly stated in claim 6, further comprising:

said frame having a first opening and a second opening;

said outlet of said enclosure located adjacent to said first opening, wherein said first opening is in fluid communication with said outlet of said enclosure when said outlet flap is in said second position; and at least one window pane disposed in said second opening.

9. An aircraft exhaust vent assembly for venting an exhaust gas through a window opening formed in an aircraft fuselage, comprising:

a frame receivable within said window opening of said airplane fuselage said frame having a first opening and a second opening;

an enclosure connected to said frame and at least partially disposed within said window opening;

an inlet formed in said enclosure and connectable to an exhaust gas source for directing said exhaust gas into said enclosure;

an outlet formed in said enclosure for venting said exhaust gas to an exterior of said aircraft fuselage;

an outlet flap connected to said enclosure for movement between a first position, wherein said outlet flap substantially seals said outlet in said enclosure when said exhaust gas is not supplied to said enclosure, and a second position, wherein said outlet flap does not seal said outlet in said enclosure to allow for said exhaust gas to be vented to the exterior of said aircraft fuselage;

an actuator operatively connected to said outlet flap for biasing said outlet flap toward said second position when said exhaust gas is supplied to said enclosure and for biasing said outlet flap toward said first position when said exhaust gas is not supplied to said enclosure;

said outlet of said enclosure located adjacent to said first opening, wherein said first opening is in fluid communication with said outlet of said enclosure when said outlet flap is in said second position;

at least one window pane disposed in said second opening;

said actuator having an actuator opening formed through said enclosure and communicatable with the interior of said enclosure; and said actuator having an actuator flap moveable in fixed relation to said outlet flap, wherein said actuator flap substantially blocks said actuator opening when said outlet flap is in said first position, and wherein said actuator flap does not substantially block said actuator opening when said outlet flap is in said second position.

10. The aircraft exhaust vent assembly stated in claim 9, further comprising:

a flag connected to said actuator flap, wherein said flag is not visible from the exterior of said aircraft fuselage through said at least one window pane in said second opening when said outlet flap is in said first position, and wherein said flag is visible from the exterior of said airplane fuselage through said at least one window pane in said second opening when said outlet flap is in said second position to indicate that said outlet flap is not sealed with respect to said outlet.

11. The aircraft exhaust vent assembly stated in claim 10, further comprising:

said outlet flap complementarily engaging said frame when said outlet flap is in said first position.

12. The aircraft exhaust vent assembly stated in claim 11, further comprising:

said outlet flap disposed substantially within said enclosure when said outlet flap is in said second position.

13. An aircraft exhaust vent assembly for venting an exhaust gas through a window opening formed in an aircraft fuselage, comprising:

a frame receivable within said window opening of said aircraft fuselage, and said frame having a first opening and a second opening;

an enclosure connected to said frame and at least partially disposed within said window opening;

an inlet formed in said enclosure and connectable to an exhaust gas source for directing said exhaust gas into said enclosure;

an outlet formed in said enclosure adjacent to said first opening of said frame for venting said exhaust gas to an exterior of said airplane fuselage;

at least one window pane disposed in said second opening;

an outlet flap connected to said enclosure for movement between a first position, wherein said outlet flap substantially seals said outlet in said enclosure when said exhaust gas is not supplied to said enclosure, and a second position, wherein said outlet flap does not seal said outlet in said enclosure to allow for venting of said exhaust gas to said exterior of said aircraft fuselage;

an actuator opening formed through said enclosure in fluid communication with the interior of said enclosure;

an actuator flap moveable in fixed relation to said outlet flap for biasing said outlet flap toward said second position when said exhaust gas is supplied to said enclosure and for biasing said outlet flap toward said first position when said exhaust gas is not supplied to said enclosure, wherein said actuator flap substantially blocks said actuator opening when said outlet flap is in said first position, and wherein said actuator flap does not block said actuator opening when said outlet flap is in said second position; and a locking member engageable with said outlet flap for restraining said outlet flap from moving toward said second position when said exhaust gas is not supplied to said enclosure.

14. The aircraft exhaust vent assembly stated in claim 13, further comprising:

said actuator flap rigidly connected to said outlet flap.

15. The aircraft exhaust vent assembly stated in claim 13, further comprising:

said actuator flap extending substantially perpendicular to said outlet flap.

16. The aircraft exhaust vent assembly stated in claim 13, further comprising:
   a flag connected to said actuator flap, wherein said flag is not visible from the exterior of said airplane fuselage through said at least one window pane in said second opening when said outlet flap is in said first position, and wherein said flag is visible from the exterior of said airplane fuselage through said at least one window pane in said second opening when said outlet flap is in said second position to indicate that said outlet flap is not sealed with respect to said outlet.

17. The aircraft exhaust vent assembly stated in claim 13, further comprising:
   said outlet flap complementarily engaging an interior periphery of said first opening of said frame when said outlet flap is in said first position; and
   said outlet flap disposed substantially within said enclosure when said outlet flap is in said second position.

* * * * *